United States Patent [19]

Freeman

[11] Patent Number: 5,949,995

[45] Date of Patent: *Sep. 7, 1999

[54] PROGRAMMABLE BRANCH PREDICTION SYSTEM AND METHOD FOR INSERTING PREDICTION OPERATION WHICH IS INDEPENDENT OF EXECUTION OF PROGRAM CODE

[76] Inventor: Jackie Andrew Freeman, 75 S. 13th St., San Jose, Calif. 95112

[*] Notice: This patent issued on a continued prosecution application filed under 37 CFR 1.53(d), and is subject to the twenty year patent term provisions of 35 U.S.C. 154(a)(2).

[21] Appl. No.: 08/691,785

[22] Filed: Aug. 2, 1996

[51] Int. Cl.$^6$ ............................................. G06F 9/42

[52] U.S. Cl. .......................... 395/586; 395/584; 395/704

[58] Field of Search .................................. 395/580, 586, 395/588, 582, 587, 800, 584

[56] References Cited

U.S. PATENT DOCUMENTS

| | | | |
|---|---|---|---|
| 4,370,711 | 1/1983 | Smith | 364/200 |
| 4,763,245 | 8/1988 | Emma et al. | 364/200 |
| 5,136,696 | 8/1992 | Beckwith et al. | 395/375 |
| 5,197,137 | 3/1993 | Kumar et al. | 395/677 |
| 5,226,130 | 7/1993 | Favor et al. | 395/375 |
| 5,228,131 | 7/1993 | Ueda et al. | 395/375 |
| 5,276,882 | 1/1994 | Emma et al. | 395/700 |
| 5,303,355 | 4/1994 | Gergem et al. | 395/588 |
| 5,313,637 | 5/1994 | Eickemeyer | 395/700 |
| 5,408,637 | 4/1995 | Shimizu | 395/500 |
| 5,454,117 | 9/1995 | Puziol et al. | 395/800 |
| 5,471,593 | 11/1995 | Branigin | 395/375 |
| 5,515,519 | 5/1996 | Yoshioka et al. | 395/581 |
| 5,553,255 | 9/1996 | Jain et al. | 395/582 |
| 5,584,001 | 12/1996 | Hoyt et al. | 395/585 |
| 5,664,191 | 9/1997 | Davidson et al. | 395/670 |
| 5,742,804 | 4/1998 | Yeh et al. | 395/584 |
| 5,848,269 | 12/1998 | Hoyogo | 395/586 |

OTHER PUBLICATIONS

Andreas Krall, "Improving Semi–static Branch Prediction by Code Replication," *Association for Computing Machinery*, vol. 29, No. 26, Jun. 1994, 97–106.

Yeh et al., "A Comparison of Dynamic Branch Predictors that Use Two Levels of Branch History," *Association for Computing Machinery*, vol. 21, No. 2, May 1993, 257–266.

Su et al., "A Comparative Analysis of Branch Prediction Schemes", Jan. 17, 1996.

Motorola, *PowerPC 601 RISC Microprocessor User's Manual*, 2–18 thru 2–19.

Chang et al., "Branch Classification: a New Mechanism for Improving Branch Predictor Performance," *Association for Computing Machinery*, Mar. 1994, 22–31.

Srivastava et al., "Prophetic Branches: A Branch Architecture for Code Compaction and Efficient Execution," *IEEE*, 1993, 94–99.

Patterson et al., *Computer Architecture A Quantitative Approach*, (San Francisco: Morgan Kaufmann Publishers, Inc., 1996), 262–278.

Davidson et al., "Reducing the Cost of Branches by Using Registers," *IEEE*, Aug. 1990, 182–191.

(List continued on next page.)

*Primary Examiner*—Meng-Ai T. An
*Assistant Examiner*—Gautam R. Patel
*Attorney, Agent, or Firm*—Gray Cary Ware & Freidenrich

[57] ABSTRACT

A system for predicting branches in a computer system is provided having a memory containing program code comprising a plurality of instructions, said instructions including branch instructions and prediction operations, a store containing an reference to a branch instruction in said program code and corresponding prediction data, means for modifying said prediction data in response to said prediction operations contained within said program code, means for predicting an outcome of a branch instruction based on the prediction data to generate a prediction, and means responsive to the prediction for predicting the outcome of a branch instruction. A method for predicting branches is also provided.

13 Claims, 7 Drawing Sheets

OTHER PUBLICATIONS

August et al., "Architectural Support for Compiler–Synthesized Dynamic Branch Prediction Strategies: Rationale and Initial Results".

Calder et al., "Reducing Indirect Function Call Overhead in C++ Programs".

Gerlek et al., "Beyong Induction Variables: Detecting and Classifying Sequences Using a Demand–Driven SSA Form," *Association for Computing Machinery*, vol. 17, No. 1, Jan. 1995, 85–122.

Ammarguellat et al., "Automatic Recognition of Induction Variables and Recurrence Relations by Abstract Interpretation," *Association for Computing Machinery*, vol. 25, No. 6, Jun. 1990, 283–294.

Ball et al., "Branch Prediction for Free," *Association for Computing Machinery*, Jun. 1993, 300–313.

Mueller et al., "Avoiding Conditional Branches by Code Replication", *Association of Computing Machinery*, Feb. 1995, 56–66.

Jason R.C. Patterson, "Accurate Static Branch Prediction by Value Range Propagation," *Association of Computing Machinery*, Feb. 1995, 67–78.

Wu et al., "Static Branch Frequency and Program Profile Analysis," *Association of Computing Machinery*, Mar. 1994, 1–31.

Calder et al., "Corpus–based Static Branch Prediction," *Association of Computing Machinery*, Feb. 1995, 79–92.

Young et al., "Improving the Accuracy of Static Branch Prediction Using Branch Correlation," *Association of Computing Machinery*, Mar. 1994, 232–241.-

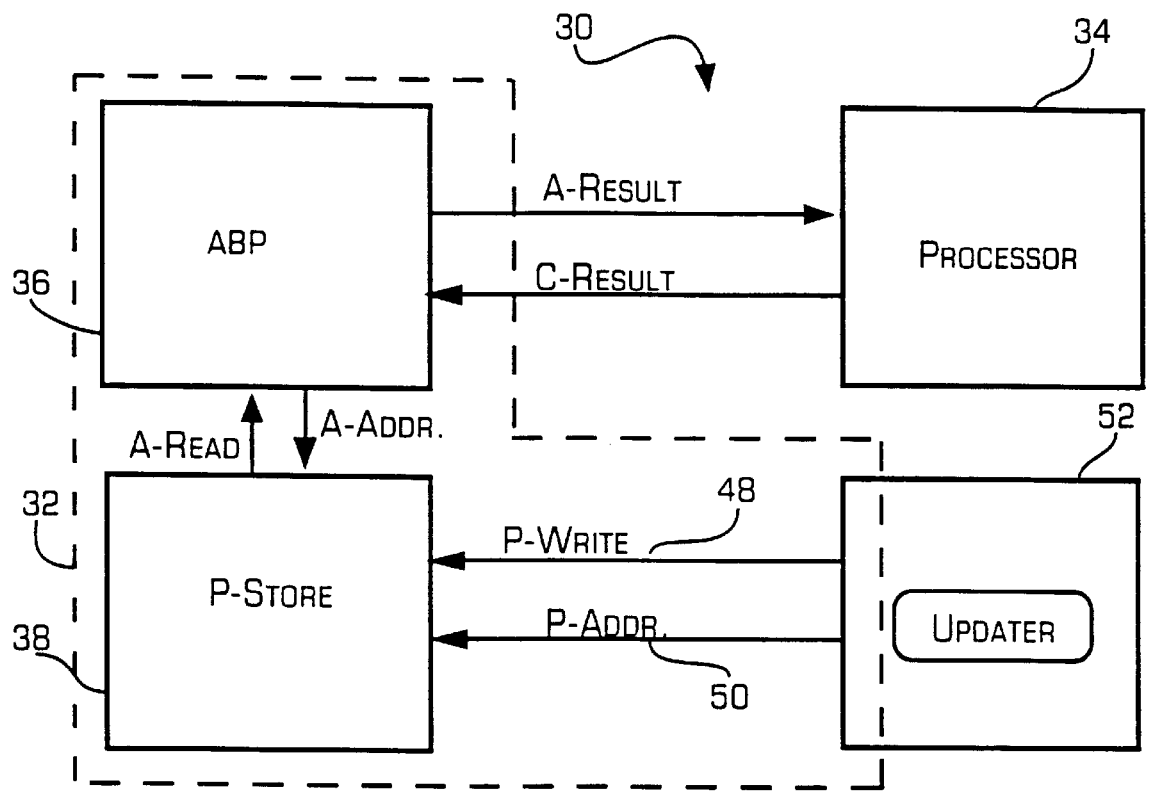

|  | Taken | Not Taken |
|---|---|---|
| 11 | 11 | 10 |
| 10 | 11 | 01 |
| 01 | 10 | 00 |
| 00 → | 01 | 00 |

|  | Taken | Not Taken |
|---|---|---|
| 11 | 11 | 01 |
| 10 | 10 | 00 |
| 01 | 11 | 01 |
| 00 | 10 | 00 |

FIGURE 11

| | 2-BIT COUNT | |
|---|---|---|
| START { BRANCH 2-BIT COUNT | | |
| IF/THEN | 00 | 0 |
| DO/WHILE | 00 | 0 |

| | 2-BIT COUNT | |
|---|---|---|
| REPEAT { | | |
| UNSPECIFIED | 00 | n-1 |

| | 2-BIT COUNT | |
|---|---|---|
| PREDICT OLD { | | |
| UNCHANGED | 00 | n-1 |

| | 2-BIT COUNT | |
|---|---|---|
| PREDICT NEW { | | |
| UNCHANGED | 10 | n-1 |

| | 2-BIT COUNT | |
|---|---|---|
| BACK { | | |
| 11 | n-2 | |
| UNCHANGED | 0 | |

| | 2-BIT COUNT | |
|---|---|---|
| END OF LOOP { | | |
| X0 | 0 | |
| UNCHANGED | 0 | |

5,949,995

PROGRAMMABLE BRANCH PREDICTION SYSTEM AND METHOD FOR INSERTING PREDICTION OPERATION WHICH IS INDEPENDENT OF EXECUTION OF PROGRAM CODE

BACKGROUND OF THE INVENTION

This invention relates generally to computer systems, and in particular to a programmable branch prediction system and method for computer systems.

In high performance processors, it is common practice to decompose an instruction into several steps, such as a fetch step, a decode step, and an execute step, and to perform each step by a different instruction processing sub-unit. These instruction processing units may operate asynchronously and do not have to be processing the same instruction. If each instructional processing unit usually is not processing the same instruction, this increases the speed of the processor. Thus, it is common practice to overlap successive instructions by one clock cycle so that as a fetch unit begins processing a second instruction, a decode unit may be processing the first instruction. On the next clock cycle, the fetch unit may be processing a third instruction while the decode unit is processing the second instruction, and the execute unit may be processing the first instruction. In a normal system, each instruction processing unit operates synchronously so that each instruction requires three clock cycles to execute. Thus, it takes twelve clock cycles to execute four instructions in a non-overlapped system. By contrast, with instruction overlap, those four instructions may be executed in only six clock cycles. This overlap increases the processing speed of the processor significantly. Similarly, the instructions being executed may be overlapped in such a way so that the decode step for two or more instructions may be done at the same time. In this overlapping system, multiple instructions may be simultaneously processed.

This instruction overlap, however, may be unavailable or inefficient, principally because of the frequent occurrence of various types of branch instructions in most programs. A branch instruction may completely eliminate any of the benefit of the instruction overlap, especially if the branch occurs and new code must be loaded into the pipeline and then executed.

Branch instructions have a significant attribute that may reduce or eliminate the efficiency of the instruction overlap. The branch may or may not be taken, which introduces a temporary uncertainty as to which instruction is next and prevents any instruction overlap because the next instruction is not known.

The problems for instruction pipelines created by branch instructions may be reduced by providing a branch instruction prediction system which predicts, prior to actual execution of the branch, whether or not the branch will be taken, the next instructions, address, or other reference to the destination of the branch, executed if the branch is taken, and the next instructions or reference to the destination of the branch, such as the address, executed if the branch is not taken. A successful branch prediction permits the processor to function without the delay in processing time caused by a branch. However, there may be a large time penalty if the prediction is incorrect; and the misprediction penalty may be greater than the delay due to the uncertainty of the branch. Therefore, high prediction accuracy in a branch instruction prediction system is desirable.

Most conventional branch instruction prediction systems are automatic branch instruction predictors which predict the outcome of a branch by reacting either to the predicted instruction sequence, to the past branch instruction behavior, or to the storing of program operands or instructions.

Conventional automatic branch instruction prediction systems may be integrated with a conventional memory hierarchy or maintained separate from the memory hierarchy. For example, one conventional system integrates an automatic branch instruction prediction system into an instruction cache. This integration permits the system to serve as an instruction cache as well as a branch predictor, which is beneficial, since both systems must be operating on the same instructions and may share memory or other resources. Other conventional systems improved on the basic integrating concept by having systems that automatically reorganize the executing program into traces containing instructions from non-sequential address ranges and store these traces together with prediction and recovery information in the cache.

To achieve higher accuracy predictions of branch behavior, which may be whether a branch is taken (the predicted outcome) and/or the address or reference to the destination of the branch that the branch goes to after a successful prediction of the outcome (predicted result), there are a number of conventional branch prediction systems that attempt to accurately predict the outcome and the result of a branch. These conventional systems have varying degrees of accuracy, as described below. Some accurately predict 60% of the branch outcomes and results while the most accurate systems may have an accuracy of 90%. These conventional branch prediction systems may be grouped into several different categories including static branch predictors, dynamic branch predictors, implicitly programmable branch predictors, and explicitly programmable branch predictors. Each of these categories has different advantages and disadvantages and different prediction accuracies.

In a static branch instruction prediction system, branches are predicted based on static, unchanging information. For example, one conventional static automatic branch instruction prediction system identifies branches in a predicted instruction sequence and then always predicts that each branch will be taken. This branch prediction system has an accuracy of about 60 percent (i.e., it guesses correct about 60 percent of the time). A more accurate static branch prediction system predicts that a branch is taken if the destination address of the branch is at a numerically lower memory location than the branch instruction itself. Another conventional static branch prediction system uses prediction information that is encoded into the branch instruction itself at the time that the branch instruction is compiled. All of these systems predict that a given branch will behave according to static prediction information. However, if the branch behavior changes at any time after the static branch prediction information is generated, then the static branch prediction system may mispredict the branch behavior. For example, if the behavior of a branch instruction is dependent on another variable which is undefined at the time of compiling, then the behavior of the branch may change after the static prediction information is generated. The prediction decision for each given branch is fixed, so the accuracy of these static branch prediction systems is limited. To increase the accuracy, dynamic branch prediction systems may be used.

In a dynamic branch prediction system, the outcome of a branch is predicted based on dynamic information, such as past branch behavior, that may change or be modified during the execution of the program. For example, one conventional dynamic branch prediction system uses a saturating counter, updated by prior branch taken/not-taken decisions, to predict that a branch will be taken if prior branch decisions indicate that the branch was recently taken more often than not. Otherwise, the dynamic system will predict that the branch will not be taken. After the branch is executed, the branch prediction information may be updated.

A variety of dynamic branch prediction systems have been proposed that use past branch instruction behavior to predict future behavior of the branch instruction. These dynamic branch prediction systems, however, still have limited accuracy because these systems use past program data and branch behavior to predict future branch behavior. Past program behavior may not accurately predict future branch behavior.

Another conventional dynamic branch prediction system uses special branch instructions for certain branches with predictable behavior, such as procedure returns and loops. These special branch instructions have an agreed upon usage of operands and this usage may be transformed into accurate predictions of these certain branches. These systems, however, do not accurately predict other branches. Some of these dynamic systems described above predict the outcome of the branch (i.e., whether or not the branch is going to be taken), but do not predict the destination address of the branch if the branch is taken. The accuracy and effectiveness of a branch predictor may be increased by accurately predicting both the outcome of a branch and the result of a branch.

When a prediction of whether a branch will be taken is made, the next step is to determine what will be the reference to the destination of the branch, such as the address. If the branch is not taken, then the next destination of the branch will be the next address after the branch so that the destination of the branch may be easily predicted. If the branch is predicted to be taken, however, it can be more difficult to determine what will be the next address. One conventional destination address prediction system predicts the destination of procedural returns by using a stack mechanism. In this system, when the program branches to a subroutine, for example, the address of the last instruction executed before the subroutine may be stored in the stack. When the subroutine is complete, the address stored in the stack may be used to determine the next address. This stack, however, cannot predict computer determined destinations, such as a calling address for C++ virtual functions, since the calling address of the virtual function is not statically fixed or produced by a previous branch. Thus, these systems do not operate effectively for all types of branches.

Another conventional destination address prediction system uses a branch history table that contains the past destination addresses for various branches. Once again, this system may predict procedural returns, but cannot predict computer generated destinations since past destinations may not be accurate future destinations because the destination of a branch may change. A third branch address prediction system uses dedicated return address registers to predict branch destination addresses by observing the stored values in the dedicated registers. These dedicated register systems require special hardware and provisions for these registers in the instruction set that are not always available so this system has limited utility. A fourth branch address prediction system monitors all stored operands to determine future branch addresses, but this system is only as good as the information being used which only includes past program behavior, and the limited amount of analysis that can be performed at run-time. These branch address prediction systems have about the same accuracy as some of the branch outcome predictors. To further increase the accuracy of any of these above systems, a programmable branch prediction system may be used.

A programmable branch prediction system provides some form of programmable control over the operation of any of the automatic branch prediction systems described above. In these programmable systems, the automatic branch prediction system does the actual branch predictions and the programmable system only interferes with the predictor to adjust prediction information that may be incorrect or to incorporate information derived from examining the program state. These programmable systems, as a result, are transparent to and compatible with all automatic branch prediction systems since these systems merely exert control over the prediction system. These programmable branch prediction systems may use implicit control or explicit control, as described below.

Implicitly programmable branch prediction systems do not directly affect the branch prediction information. For example, programmable system that use implicit control may choose between alternate code fragments which implement the same function in different ways. The implicit programmable system may choose the code fragment that is most likely to be accurately predicted by the branch prediction system in a particular execution context. These implicit systems, however, require more storage space since multiple code fragments must be stored, and may not be useful for more complex branches. In addition, since some programs are executed from a read only memory (ROM), this system cannot be used for these programs because alternative code fragments may not be written into a read only memory. There are also implicit programmable systems that use prediction information encoded within a branch instruction. These systems, however, suffer when it becomes necessary to change the information encoded within the instruction. All of these system are implicit because the programmer does not actually directly control the branch prediction system, but does control the branches given to the branch prediction system. Explicit programmable branch prediction may be more accurate and require less memory space.

Explicitly programmable systems directly control the branch prediction systems by using prediction operations, instructions or instruction sequences. These instruction are added into the program code. These explicit systems are more flexible because the added instructions may be added into any instruction set, and the prediction op_codes chosen such that older processor designs treat them as no_op instructions so that these older systems may still use the program code even with the additional branch prediction operations. These explicit system usually control whether the underlying branch prediction system is going to be used at a particular time, whether the prediction information will be updated and bulk initialization of the prediction information. These explicit programmable systems, however, affect all predictions done by a branch predictor unless the branch predictor is activated and deactivated in turn.

None of these systems described above provides a programmable branch prediction system that can accurately and reliably predict branch outcomes and destination addresses for any branch. In addition, none of these conventional systems provides explicit control over the prediction of each individual branch.

There is a need for a programmable branch prediction system and method which avoid these and other problems of known devices, and it is to this end that the present invention is directed.

SUMMARY OF THE INVENTION

The invention provides a programmable branch prediction system that is more flexible than some conventional systems because the invention may control the storage of underlying prediction information within the branch prediction system. In addition, the invention provides a programmable branch prediction system that does not modify the program code or choose between code fragments so that the disadvantages of those conventional systems do not exist. The invention also provides a programmable branch prediction system that may have explicit control of the prediction data for a selected branch before actually executing the branch and without affecting predictions for other branches.

The explicit manipulation of the prediction information of the underlying branch prediction information provides prediction accuracies that are at least as high as, if not higher than, any conventional branch prediction system. In addition, since the underlying branch prediction information is being controlled, a programmable branch prediction system in accordance with the invention may be used with any type of branch instruction and may be added to any instruction set. The programmable branch prediction system may also incorporate any type of automatic branch prediction system.

The invention may also provide a programmable branch prediction system that saves and stores prediction information so that various types of branches may be predicted. For example, for task switches, in which the execution of one piece of program code is interrupted by another different piece of program code, the prediction information for the old task may be stored. Then, if the program ever returns to that task, the prediction information for that task may be loaded back into the branch prediction system. Similarly, prediction data for a branch may be saved and restored later independent of task switches. Thus, the prediction accuracy of the invention for task switches and programs that operate in phases is dramatically increased.

In accordance with the invention, a programmable branch prediction system is provided that may have a memory containing program code comprising a plurality of instructions, said instructions including branch instructions and prediction operations, a store containing an reference to a branch instruction in said program code and corresponding prediction data, means for modifying said prediction data in response to said prediction operations contained within said program code, means for predicting an outcome of a branch instruction based on the prediction data to generate a prediction, and means responsive to the prediction for performing an operation. A method for predicting branches is also provided. In addition, a method for inserting prediction operations into a program code is provided.

BRIEF DESCRIPTION OF THE DRAWINGS

FIG. 2 is a block diagram of a first embodiment of the programmable branch prediction system in accordance with the invention;

FIG. 3 is a schematic diagram of prediction data that may be stored in the prediction information storage system of FIG. 2;

FIG. 11 is a table of sample prediction data values for a fragment of program code wherein the branches are being predicted by the programmable branch prediction system.

DETAILED DESCRIPTION OF A PREFERRED EMBODIMENT

The invention is particularly applicable to a programmable branch prediction system. It is in this context that the invention will be described. It will be appreciated, however, that the system and method in accordance with the invention has greater utility.

Figure 1:
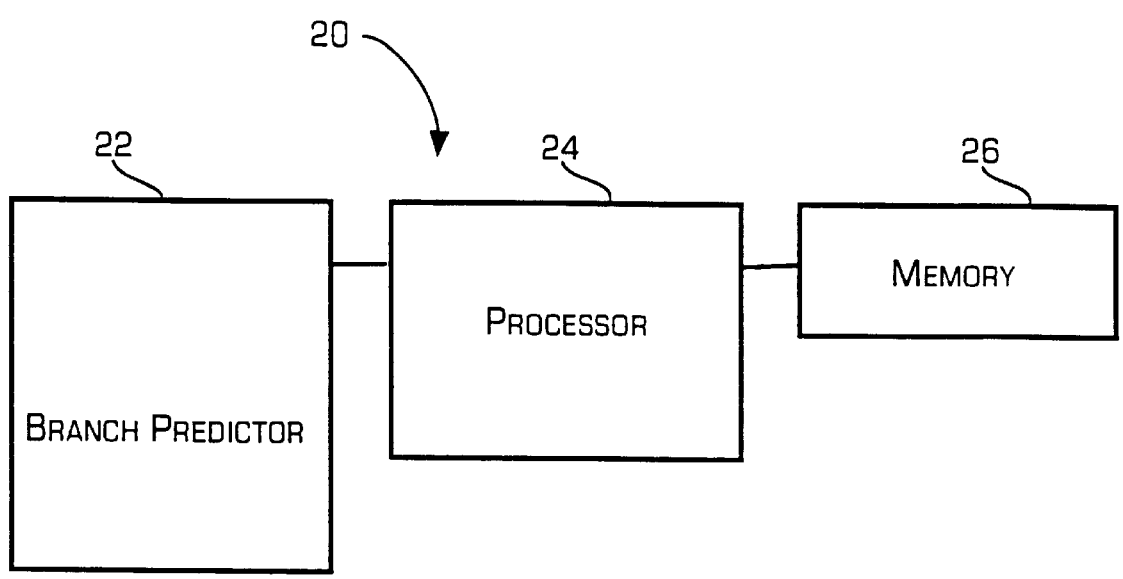
FIG. 1 is a block diagram of an automatic branch prediction that may incorporate a programmable branch prediction system in accordance with the invention.

FIG. 1 is a block diagram of a computer system 20 with a branch prediction system. The computer system may include a branch predictor 22, a processor 24 and a memory 26. The processor, as in most computer systems, controls the operation of the computer by executing instructions that may be stored in the memory 26. The invention is not limited to any particular type of processor and may include both Complex Instruction Set Code (CISC) type processors as well as Reduced Instruction Set Code (RISC) type processors.

Within the processor, there may be one or more instruction pipelines so that several instructions are being processed simultaneously, as is known in the art. A group of instructions may be typically retrieved from memory and placed in the one or more instruction pipelines. As the group of instructions are being loaded into the one or more instruction pipelines within the processor, the branches may be detected and flagged by known systems. The outcome of the flagged branches may then be predicted by the branch predictor. For example, whether the branch will be taken based on some branch prediction data, as described below, may be determined. If the branch is predicted to be taken, then the branch predictor may also predict the destination of the branch; the destination may be represented as an address to which the branch will go. The branch predictor may also predict whether the branch will be taken and what is the destination of the branch, such as the address, at the same time. As described above, the prediction may be accomplished by a variety of different automatic branch predictors, including static branch predictors and dynamic branch predictors. If the branch is predicted to be not taken, then the processor does not do anything special since the instruction directly after the branch should be executed. However, if the branch is predicted to be taken, then the processor or the automatic branch predictor will take the appropriate action based on the branch prediction so that the next instructions loaded into the instruction pipeline are the predicted instructions. In this manner, the processor executes the instructions within the memory in accordance with the prediction made by the branch predictor. Now, a programmable branch prediction system in accordance with the invention will be described.

FIG. 2 is a block diagram of a first embodiment of a programmable branch prediction system in accordance with the invention. A computer system 30 may include a programmable branch prediction system 32 as shown. The computer system may also include a processor 34. The processor, as described above, may execute instructions that may be stored in a memory that is not shown. As described above, the invention is not limited to any particular type of processor and may include CISC type and RISC type processors.

The programmable branch prediction system 32 may include an automatic branch predictor (ABP) 36 and a prediction data storage system (P-STORE) 38. The automatic branch predictor 36 may be any type of conventional branch prediction system since the programmable branch prediction system 32 may incorporate any conventional branch prediction system, as described below. For example, a branch prediction system that predicts branches based on prior branch history may be used. For the embodiments described, a prior branch history prediction system with a one-bit or two-bit counter will be described for clarity, but any other type of automatic branch prediction system may also be used because the programmable branch prediction system modifies the prediction data in the P-STORE and may be modified to operate with any type of prediction data. Although an automatic branch predictor that predicts only the outcome of the branch is shown, a branch predictor which predicts both the branch outcome and the destination address may also be used.

The automatic branch prediction system 36 may store, for example, prediction data relating to the past branch history in the P-STORE 38. In FIG. 3, an example of the prediction data stored in the P-STORE 38 for a past branch history automatic predictor with a one-bit counter is shown. The prediction storage 38, for this particular example, may have a branch reference column 40 and a corresponding prediction data column 42 for each branch. If a different type of branch prediction system was being used, then the data in the P-STORE would also be different. The branch reference column 40 may contain the address of a branch 44. The corresponding prediction column 42 may store the predicted outcome 46 of the particular branch. In the example shown, the first branch is predicted to be taken, and the second branch address is predicted to be not taken.

The invention is not limited to any particular method for referencing the prediction data, however, two preferred referencing methods will be described. First, a branch reference, such as a branch address, may be mapped to a P-STORE reference, such as a PSTORE address. The mapping may occur by a number of known methods, such as direct mapping, set associative, or associative mapping. The prediction data may also be referenced directly in that the prediction operations each specify the P-STORE reference. As described above, the reference for the prediction data may be an address, but it may also be any other piece of data associated with the particular branch. The prediction data may include mapping information which indicates how a branch reference is transformed into a reference in the P-STORE.

Referring back to FIG. 2, when a branch instruction or reference to the branch instruction is encountered by the ABP, the ABP determines the reference for the particular branch, as described above, and then accesses the correct prediction data in the P-STORE 38 through an A_Addr line, and reads the prediction data out of the P-STORE over a A_Read line. The ABP then sends the prediction data back to the processor over a A_Result line. The ABP may or may not be able to update the P-STORE. For example, for the first branch, the processor is informed that the branch is predicted to be taken so the processor loads the instructions pointed to by the branch into the instruction pipeline.

The invention provides a system and method for changing the prediction data stored in the P-STORE 38 independently of the automatic branch predictor. The invention may modify the prediction data at any time. Whereas the automatic branch predictor described above uses the prediction data that is stored in the P-STORE, the invention generates and/or modifies that prediction data, during the execution of a program, in response to prediction operations. These prediction operations may be generated prior to execution of the program by a separate computer system running a compiler type of program, as described below. For example, the prediction data in the P-STORE for a procedure call instruction is generated when the program is compiled. However, before execution of the program, the actual destination address for the procedure call may not be known. Thus, an automatic branch predictor would mispredict the destination of the procedure call. However, once the program is being executed, the procedure call destination may be determined using a prediction operation, as described below, and then the correct destination may be loaded into the P-STORE prior to execution of the procedure call instruction. Thus, when the actual task switch instruction is being executed, the automatic branch predictor, based on the updated prediction data provided by the invention, will correctly predict the destination of the procedure call.

The invention works in conjunction with any automatic branch prediction system and modifies the prediction data based on prediction operations, as described below in more detail. The invention increases the accuracy of any conventional automatic branch prediction system, but does not interfere with the operation of the automatic branch predictor because the invention updates, modifies or accesses the prediction data only. In the embodiment shown, the capability for modifying the data within the P-STORE independently of the automatic branch predictor may be provided by a P_Write line 48 and a P_Addr line 50. These lines may be connected to an updater 52 that may update the prediction data stored in the P-STORE 38. The updater 52 may also update the prediction data by reading the prediction data from the F-STORE in certain situations, as described below.

The updater may be a second processor that executes the same instructions as the processor 34 and reacts to instruction operations that have been inserted in the program code being executed, as described below. In response to these prediction operations, the prediction data within the P-STORE may be modified, updated, or accessed. An example of the prediction operation which causes the updater to modify a value in the P-STORE will be described below.

Figure 4:
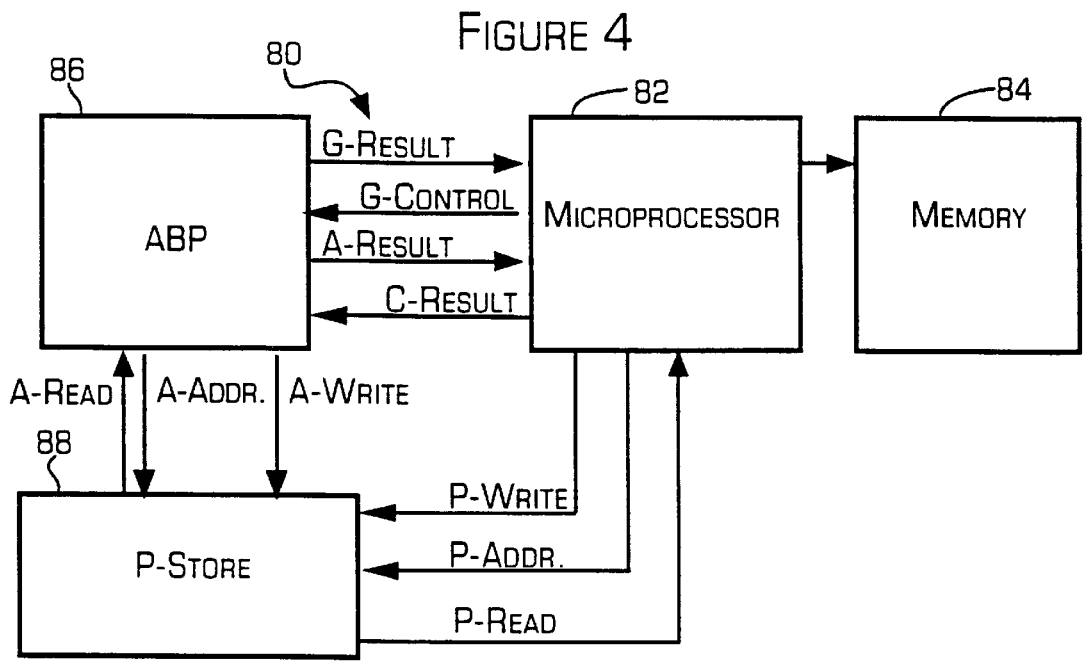
FIG. 4 is a block diagram of a second embodiment of a programmable branch prediction system in accordance with the invention.

FIG. 4 is a block diagram of a second embodiment of the programmable branch prediction system 80 for a computer. The programmable branch prediction system may include a processor 82, a memory 84 for storing instructions, an automatic branch predictor 86, and a P-STORE 88. This embodiment is similar to the previous embodiment, but the P-STORE is connected to the processor because the updater, as described above, in this embodiment, may be a program running on the processor. In fact, the update in this embodiment may be part of the program being executed by the processor as prediction operations embedded within the program code. For this embodiment, the instruction set of the processor may be modified so that the processor understands how to interpret the prediction operations, and can update the contents of the P-STORE.

The processor 82 has the same A_Result and C_Result lines for controlling the automatic branch predictor, but may also have a G_Control line for causing the automatic branch predictor to reset the contents of the P-STORE. The processor may also request information from the automatic branch predictor over the G_Control line. For example, past prediction accuracy, may be delivered to the processor over a G_Result line.

As shown, the automatic branch predictor 86 requests prediction data from the storage system over a A_Addr line, and receives those predictions over the A_Read line. In this embodiment, the automatic branch predictor may also write data into the P-STORE 88 after the branch has been executed over a A_Write line. When the automatic branch predictor mispredicts a branch, then the automatic branch predictor may revise the prediction data for that branch in the storage system. The automatic branch predictor, using an A_WRITE line, writes prediction data into the P-STORE after a branch has been executed.

As described above, the system for updating the data within the prediction data storage may be, in this embodiment, a program running on the processor. For both this embodiment and the first embodiment, the updater updates the data within the P-STORE in response to one or more prediction operations that may be embedded within the program code. For example, as the program code is being compiled, a compiler, that may be completely separate from the programmable branch prediction processor, may check the code being compiled for certain conditions and types of instructions so that prediction operations may be inserted into the compiled instruction code or as that code is produced. The generation and insertion of these prediction operations into the program code will be described below. When executed, the inserted prediction operations cause the prediction data in the P-STORE to be updated. As described above, some branches have unknown destination at compile time, but will have a definite destination once the execution of the program begins, or the destination may change during program execution. Thus, there may be an prediction operation in the compiled code that causes the updater to look at the particular branch to determine the address and then update the stored prediction data.

In order to ensure compatibility of the invention with prior instruction sets, the prediction operations for the programmable branch prediction system may be expressed in terms of unused no_operation codes in older systems. Thus, the programmable branch predictor in accordance with the invention may be used with modern computer architectures designed for branch predictors, but may also be used with older systems since the prediction operations will not interfere with any proper operation on an older system.

In this second embodiment, the updating of the prediction data in the storage system may be accomplished by the programmable branch predictor running on the processor. Then, if an update to the prediction data is required, the update may be done using the P_Addr and P_Write lines as described above. The prediction data in the P-STORE may also be updated by reading the prediction data out of the P-STORE through a P_READ line. Now, a third embodiment of the invention will be described.

Figure 5:
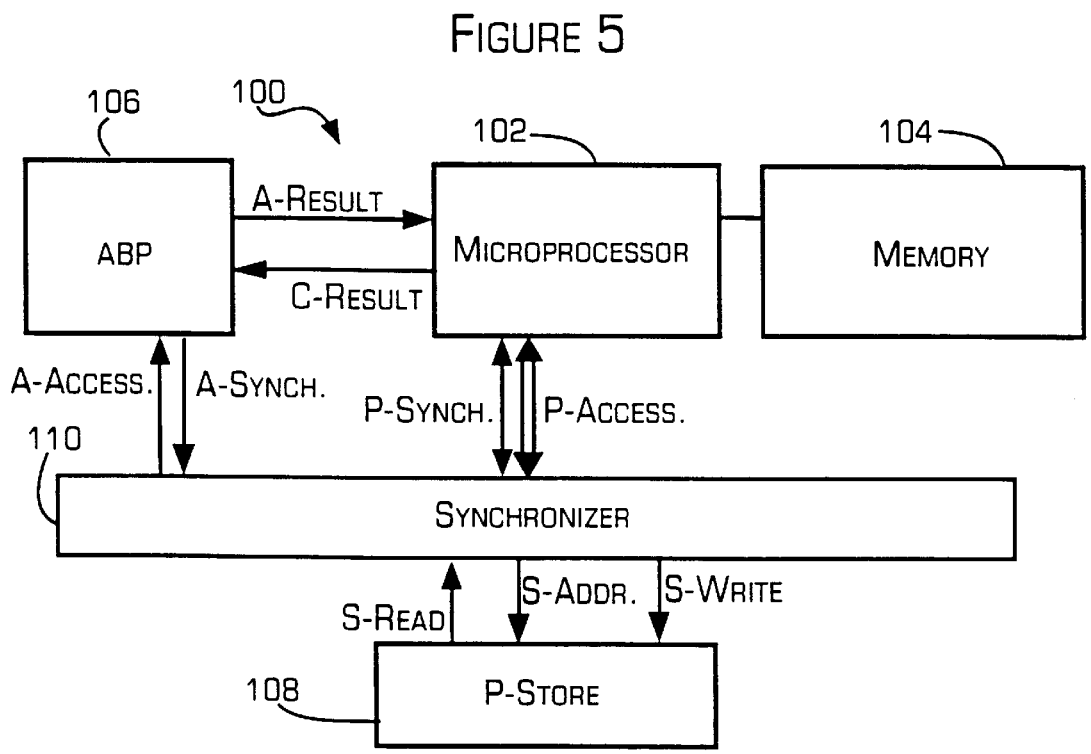
FIG. 5 is a block diagram of a third embodiment of a programmable branch prediction system in accordance with the invention.

FIG. 5 is a block diagram of the third embodiment 100 of the programmable branch prediction system in accordance with the invention. This embodiment of the programmable branch predictor may include a processor 102, a memory 104, an automatic branch predictor 106, and a P-STORE 108. These systems were described above in detail and will not be described here. The programmable branch prediction system 100 may also include a synchronizer 110. The synchronizer may control the processor through the P_Sync line and the automatic branch predictor through the A_Sync line. The synchronizer may be utilized to ensure that prediction data from the P-STORE is received by the automatic branch predictor at the proper time (i.e., receiving the branch prediction data after the branch has occurred is too late). The synchronizer system is well known in the art. This programmable branch predictor may update data stored within the P-STORE through the P_Access line as described above. In this embodiment, however, the P_Access line may operate as the P_Write, P_read, and P_Addr lines. This embodiment operates in the same manner as the previous embodiments and will not be described here. Now, an example of the operation of the programmable branch prediction system will be described.

Figures 6, 7, 8:
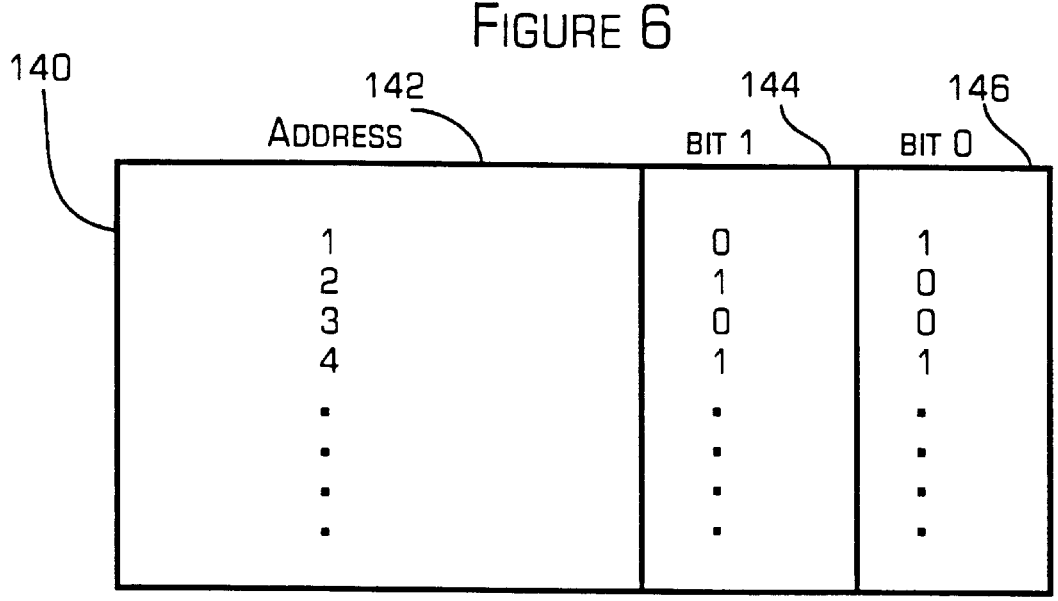
FIG. 6 is a diagram of an example of a prediction data storage system that may use a 2-bit counter.
FIG. 7 is table showing the manipulation of the 2-bit counter of FIG. 6 by a conventional branch prediction system.
FIG. 8 is a table showing an example of the manipulation of the 2-bit counter of FIG. 6 by a programmable branch prediction system in accordance with the invention.

FIG. 6 is a schematic diagram of the contents of the P-STORE for a 2-bit counter prediction system. In a two-bit counter automatic branch prediction system two bits are used to keep track of past branch predictions. As shown, a data storage system 140 may have an address field 142, a bit_1 field 144 and a bit_0 field 146. If a branch has never been taken previously or has not been taken at least twice, then, as shown for address 3, both bits are 0. If the branch was taken once, bit_0 is "1" as shown for address 0. If a branch is taken twice, then bit_1 is "1" and bit_0 is "0" as with any binary counter. For this two-bit counter automatic branch predictor, future branches are predicted to be taken if bit_1 is "1".

In a conventional system, as shown in FIG. 7, the four possible states of the counter (00, 01, 10, 11) are shown along with the effect, of a taken branch and a not taken branch, on the counter. As shown, a taken branch that is predicted will increment the counter by one. Thus "10" will become "11." A not-taken branch that is predicted will decrement the counter by one. In this manner the counters are either increased or decreased by one after the execution of each branch.

FIG. 8 is a table showing the effects of the invention on the 2-bit counter. The invention does not necessarily increment or decrement the counter, but may set the counter so that a branch will be predicted to be taken the next time it is executed. To accomplish this, for example, bit_1 of the counter may be set to "1" to force the branch to be predicted to be taken, or set to "0" to force the branch to be predicted to be not taken. An example of the types of prediction operations that may be inserted into a compiled code will be described below. Generally, the method of inserting the prediction operations includes analyzing the program to determine if there are any opportunities for computing data that may be used to predict future branch behavior, and inserting prediction operations into the computer code to update or modify the P-STORE so that the branch predictor reacts accordingly. Now, two examples of a method of inserting those prediction operations into a program code will be described.

The prediction operations may use a prediction expression or a prediction pattern to modify the P-STORE contents. An example of a prediction expression may be a propagated value, as described below. An example of a prediction pattern may be a induction variable, as described below. The prediction expression may be any expression that may be used to predict or calculate the the expression on which the behavior of a branch depends. Similarly, a prediction pattern is a pattern of predictions that may be used to predict or calculate the expression on which the behavior of a branch depends. There are many kinds of procedures or methods that may be used to identify prediction expressions or patterns, and all of these expressions or patterns may be used in accordance with the invention to identify opportunities to insert prediction operations. Two examples of these different types of expressions will now be described.

Figure 9:
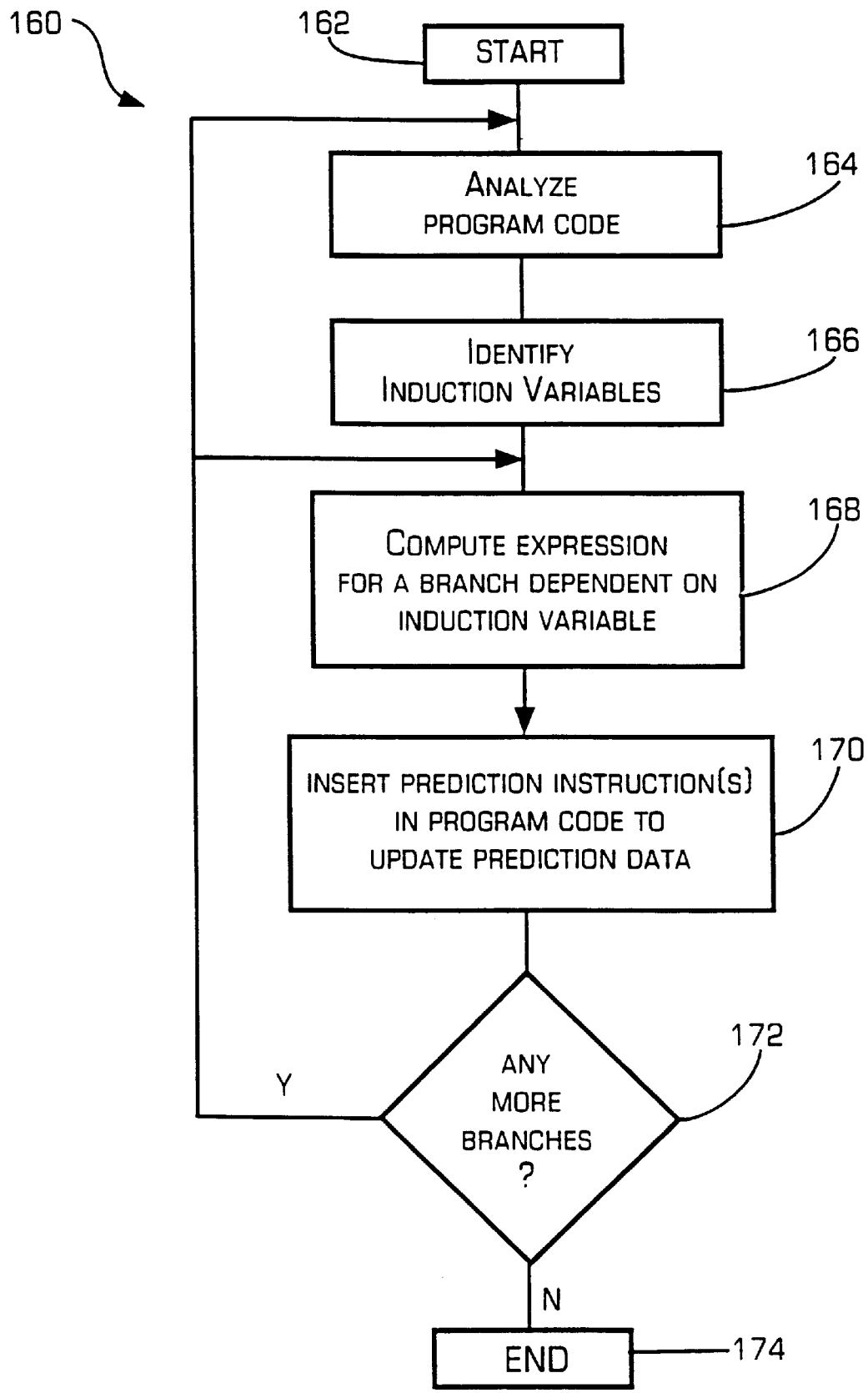
FIG. 9 is a flowchart of a first example of a method in accordance with the invention of inserting prediction operations into a computer code.

FIG. 9 is a flowchart of a first example of a method 160 in accordance with the invention of inserting prediction operations into a computer code. For the examples shown in FIGS. 9 and 10, the insertion of the prediction operation may also be carried out by the processor of the programmable prediction system. It may also be carried out by a completely separate computer system that is running a compiler that can generate and insert these specialized prediction operations into the program code. It may also be carried out by the same processor running the compiler at an earlier time than the execution of the program. Thus, the programmable prediction system may execute program code containing prediction operations that were inserted into the program code by a different computer system. The method begins at step 162, and in step 164, the program code being compiled is analyzed to search for various characteristics, such as branch addresses and variables. In step 166, any induction variables, which are examples of prediction patterns, within the program code are identified, as in known in the art. Then, in step 168, expressions are computed for branches that are dependent on the induction variable. For example, the variable controlling the number of times that a loop may be executed may be an induction variable, and the actual number of times that is loop probably will be executed may be computed. Then, in step 170, a prediction operation is inserted into the program code so that the prediction data for the branch instruction that controls the loop, for example, is updated to reflect the computed number of times that the loop is predicted to be executed. In step 172, the compiler determines if there are any more branches in the computer code that need to be analyzed. If there are other branches, then control may go back to step 164. In addition, the control may return to step 168 because a single induction variable, or set of induction variables, may control multiple branches, or all of the induction variables or branches may be identified initially. If the computer code has been completely analyzed, then the method ends at step 174.

Figure 10:
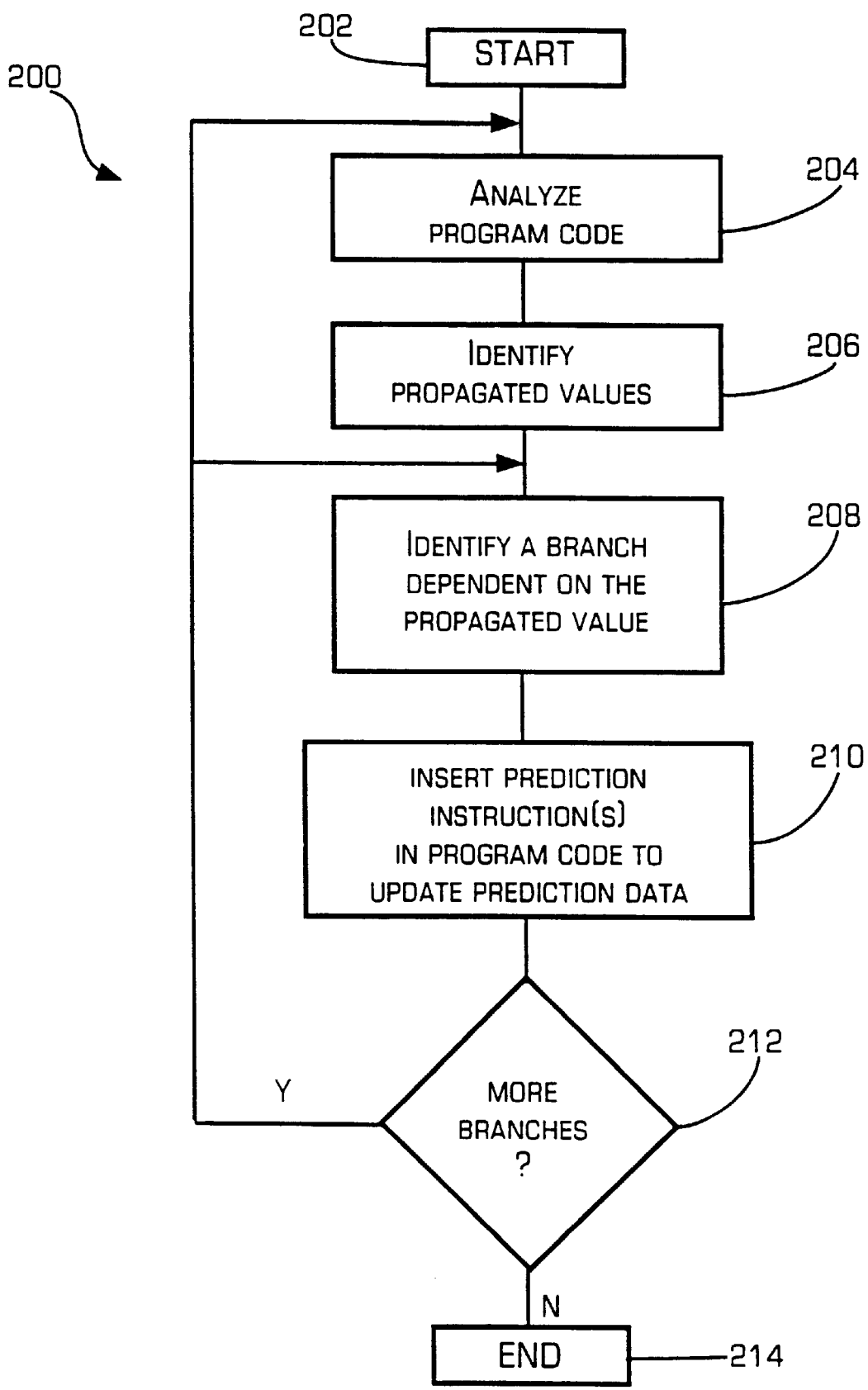
FIG. 10 is a flowchart of a second example of a method in accordance with the invention of inserting prediction operations into a computer code.

FIG. 10 is a flowchart of a second example of a method 200 in accordance with the invention of inserting prediction operations into a computer code. The method begins at step 202, and in step 204, the program code being compiled is analyzed to search for various characteristics, such as branch addresses and variables. In step 206, any propagated values, which are examples of a prediction expression, within the program code are identified, as in known in the art. Then, in step 208, expressions are computed for branches that are dependent on the propagated value. For example, the flag controlling a branch corresponding to the if statement may be, for example, a propagated value, and that propagated value may be computed. Then, in step 210, a prediction operation is inserted into the program code so that the prediction data for the branch instruction that controls the branch instruction corresponding to the if statement, for example, is updated to reflect the computed value of the propagated value. In step 212, the compiler determines if there are any more branches in the computer code that need to be analyzed. If there are other branches, then control may go back to step 204. In addition, the control may return to step 208 because a single propagated value, or set of propagated values, may be control multiple branches, or all of the propagated values or branches may be identified initially. If the computer code has been completely analyzed, then the method ends at step 214. Now, an example of inserting prediction operation, for an induction variable and a propagated value, into a piece of computer code will be described.

For this example, a fragment of a simple C source code loop will be shown compiled without the prediction operations and then compiled with the prediction operations in place and the effect that the prediction operations have of the prediction accuracy of the system.

The fragment of sample C-type source code may be:

```
i=0; flag = old; do{
    @1 flag = new;
    @2
    if (!flag){
        @3}
    else @4
} while (++i<n);
``` where @1, @2, @3, and @4 are arbitrary fragments of code. In fact, the variable flag may be changed at other points in the code. This fragment of C-like source code may be compiled into assembly code that looks like:

|        | mov    | #0,i         |
|        | mov    | old, flag    |
| TOP    | c@1    |              |
|        | mov    | new, flag    |
|        | c@2    |              |
|        | branch | flag, FLGSKP |
|        | c@3    |              |
| FLGSKP | c@4    |              |
|        | add    | #1,i         |
|        | branch | i<n, TOP     | where c@1, c@2, c@3, and c@4 are the compiled code for @1, @2, @3, and @4, respectively, and labels within the compiled code, as is known in the art, are in capital letters. The variable "i" is an induction variable, as in known in the art. The values "old" and "new" are propagated values as is known in the art.

As shown by the compiled code, the first time that the loop is entered, the branch prediction system may mispredict that the branch will not be taken since it has never previously seen that branch. Then, once the loop is being executed for the last time, the conventional branch prediction system may mispredict that the branch will be taken another time. The invention, by contrast, will correctly predict all of the branches, as described below, giving a 100% accuracy.

For the invention, several prediction operation may be added into the compiled code so that the revised compiled code may be:

|        | mov    | #0,i         |
|--------|--------|--------------|
|        | repeat | n-1, BACK    |
|        | mov    | old, flag    |
|        | predict| old, TSTFLG  |
| TOP    | c@1    |              |
|        | predict| new, TSTFLG  |
|        | mov    | new, flag    |
|        | c@2    |              |
| TSTFLG | branch | flag, FLGSKP |
|        | c@3    |              |
| FLGSKP | c@4    |              |
|        | add    | #1,i         |
| BACK   | branch | i<n, TOP     | where two sample prediction operations, "predict" and "repeat" are inserted into the compiled code, in accordance with the invention. The prediction operation may have a first argument that is the predicted value of the condition and a second argument that is the address of the branch to which the prediction applies. The prediction operation, based on the program, changes that value of the prediction data so that the branch prediction system does not mispredict the loop the first time.

The repeat prediction operation may have a first argument that may be the number of times that the branch is predicted to be taken before it will not be taken. In this example, the branch causes the program to loop n–1 times. The second argument of the repeat prediction operation may be the address of the branch to which the prediction applies. The repeat prediction operation modifies the value of the prediction data within the P-STORE so that the branch prediction system will not mispredict the end of the loop. Thus, the combination of the repeat and predict prediction operations permit the programmable branch prediction system to be 100% accurate for this simple example. Since the values of FLAG and n are known before the appropriate branches are executed, the programmable branch prediction system may add prediction operations to take advantage of this. The example shown is a simple example, and many other different prediction operations may be inserted into program code, such as a "destination" prediction operation that may predict the destination of a branch. Now the changes in the P-STORE, for the example shown, caused by the invention will be described.

For this example, the P-STORE may store a 2-bit saturation counter, as described above, and a larger counter for each branch address. An example of the predicted data storage is shown in FIG. 11. As shown, the if statement in the original C-like source code has the 2-bit counter associated with the TST_FLG label in this example, and is labeled 2-bit in the table. The larger countdown counter is associated with the BACK label (for the do loop) and is labeled C is the table. The value of these two pieces of prediction data (2-bit and C) within the storage system are shown at various points in the execution of the program code so that the changes made by the prediction operations will be more clear.

At the beginning of the execution of the compiled program code, the 2-bit counter for the if statement and the do/while loop may both be set to "00", and the countdown counter for both branches is also set to "0". For a more complex program, there would be more entries in the table. When the "repeat n–1, BACK" prediction operation is executed, the 2-bit counter for the if statement is unaffected, but the C counter for the do/while loop is set to "n–1" representing the predicted number of times that the branch will be taken to execute the loop. In addition, the 2-bit counter for the do/while loop may be set to "10" or some other value indicating that the branch should be taken next time. As described above, setting the C counter and the 2-bit counter to "n–1" and "10", respectively, prior to actual execution of the do loop prevents the branch predictor from mispredicting that the first branch of the do/while loop will not be taken. The behavior of the loop shown may also be predicted by ignoring the 2-bit counter and relying on the C counter. When the C counter reaches zero, the next execution of the branch should be predicted to be not taken. Thus, even of the branch predictor has never seen the do/while loop previously, the programmable branch predictor may ensure that the first branch of the do/while loop is correctly predicted.

When the "predict old, TSTFLG" prediction operation is encountered, the 2-bit counter for the branch instruction corresponding to the if statement may be reset to "0X", for example if "old" is assumed to be false, and the counters for the do/while loop are unaffected. The "X" indicates that the value of that bit is not important and may be any value. When the "predict new, TSTFLG" prediction operation is executed, the 2-bit counter corresponding to the branch instruction corresponding to the if statement is set to "1X ", for example if "new" is assumed to be true, which forces the branch to be predicted to be taken. This setting of the 2-bit counter for the branch corresponding to the if statement once again prevents the branch predictor from mispredicting the first branch of the if statement. The counters for the branch corresponding to the do/while loop are unaffected.

When the "branch i<n, TOP" branch operation is executed, since the C counter and the 2-bit counter of the branch instruction implementing the do/while loop has been set to predict the branch to be taken, the branch back to the beginning of the code is correctly predicted, and the C counter is decremented by one so that is may be equal to "n–2". The 2-bit counter for the branch corresponding to the do/while loop continues to hold a value of "11" since the do/while branch has been taken a number of times. The counters for the branch corresponding to the if statement are unaffected. The execution of the program code continues in this manner until the end of the do/while loop.

At the end of the do/while loop, when the C counter is equal to "0", the 2-bit counter for the branch corresponding to the do/while loop is reset to "00" by the programmable prediction system so that, the next time that the do/while loop is going to be executed, the branch predictor will correctly predict that the branch will not be taken. A conventional branch predictor may mispredict that the branch is going to be taken because these conventional systems use past branch behavior to update the values of the prediction data, and thus to predict future behavior. As shown in this example, the programmable branch predictor in accordance with the invention reduces mispredictions in a conventional automatic branch predictor, such as one-bit or two-bit counters. The prediction accuracy of the programmable branch predictor, for this example, is 100%. Since predicting the behavior of a branch at the beginning and end of loops, such as branches implementing do/while, cause most conventional branch predictors to mispredict at least once, the programmable branch predictor in accordance with the invention may correctly predict these beginning and end of loop branches.

The system and method for inserting one or more prediction operations into a program code to improve the performance of an automatic branch predictor may be carried out within the processor of the computer system, as described above, or may be carried out by a separate processor that is running a compiling program. The generation and insertion of the one or more prediction operations may be done on a completely different computer system from the system with the programmable branch predictor. In addition, the generation and insertion of the one or more prediction operations may be done immediately prior to branch prediction or at some time before any branch prediction. Thus, the programmable branch prediction system described above may, but does not have to generate or insert the one or more prediction operations. Therefore, the programmable branch prediction system may execute program code in which one or more branch instructions have been previously inserted. Similarly, the system and method for generating and inserting the one or more prediction operations may be used independently of the programmable branch prediction system described above. Two specific examples of prediction operations will now be described.

The prediction operations that are generated and inserted into a program code may either update the prediction data by writing new data into the P-STORE or update the prediction data by specifying that the new data should be read from a certain location in the P-STORE. These prediction operation that write data may be, for example, the predict and repeat prediction operations described above. However, these prediction operations for writing prediction data may also be any type of prediction operation that has a reference to the branch, such as a branch address, and the prediction data to be updated.

These prediction operations for writing prediction data may be composed of one or more prediction operations or may be expressed as different fundamental instructions. For example, the "predict old, TSTFLG" prediction operation and the "predict new, TSTFLG" prediction operation may actually be fundamental instructions such that the prediction operations affect the P-STORE, but has no effect on older systems that do not have the programmable branch prediction system. Both of these instruction cause the prediction data for the branch referred to by TSTFLG to be updated by writing prediction data into the P-STORE. The updated prediction data may cause the branch to be either predicted taken or not taken.

The prediction operation may also be expressed as more than one fundamental instruction. For example, the "predict old, TSTFLG" prediction operation may be expressed as:

mov <data>, E
mov <address>, F or output <data>, G
output <address>, H where E–H are chosen so that the instruction on an older system does nothing, but on a newer system, it affects the P-STORE. With this two instruction example, the first instructions in each pair updates the data while the second instruction in each pair updates the address. Similarly, a prediction operation may be implemented with three fundamental instruction in which the first instruction specifies the prediction data, the second instruction specifies the branch reference, and the third instruction performs the operation on the prediction data. Thus, the prediction operation may be composed of any number of fundamental instructions. Now an example of expressing a read prediction operation using instruction in accordance with the invention will be described.

A read prediction operation is similar to the write prediction operations described above, except that the read prediction operation specifies where the prediction data is stored, but does not specify the data written, as described below. Like the write prediction operations, the read prediction operation may be broken down into one or more fundamental instructions. An example of a read prediction operation will now be described.

As described above, a task switch may be handled by the programmable branch prediction system in accordance with the invention since the contents of the P-STORE prior to the task switch may be stored and then when the task is started again, the prediction data for the particular task may be stored back into the P-STORE. When a task switch is located by the compiler, the prediction data is read out of the P-STORE and stored using, for example, a "save <prediction data>" prediction operation that may be implemented, for example, by a "mov PSTORE[0 . . . n], SAVE[0 . . . n]" fundamental instruction, sequence of instructions, or subprogram. Thus, some or all of the data from the P-STORE is stored in a SAVE location. Then, when the program switches back to the original task, the prediction data stored in a SAVE location may be restored back to the P-STORE by, for example, a "restore <prediction data>" prediction operation that may be implemented, for example, by a "mov SAVE[0 . . . n], PSTORE[0 . . . n]" fundamental instruction, sequence of instructions, or subprogram. These read prediction operations would be inserted so that they are performed about the time that a task switch occurs.

While the foregoing has been with reference to a particular embodiment of the invention, it will be appreciated by those skilled in the art that changes in this embodiment may be made without departing from the principles and spirit of the invention, the scope of which is defined by the appended claims.

I claim:

1. A system for predicting branches in a computer system, comprising:

a memory containing program code comprising a plurality of instructions, said instructions including a branch instruction and a prediction operation, said prediction operation being inserted into the program code at a predetermined location in the program code relative to the branch instruction and being inserted into the program code independent of the execution of the program code;

a prediction memory containing a reference to the branch instruction in said program code and corresponding prediction data;

means for modifying said prediction data in the prediction memory in response to the execution of said prediction operations contained within said program code; and means for predicting the behavior of the branch instruction based on the prediction data in the prediction memory.

2. The system of claim 1, wherein said prediction means comprises means for predicting a destination reference of a branch that is predicted to be taken.

3. The system of claim 1, wherein said prediction means comprises a computer program being executed by said processor.

4. The system of claim 1, wherein said prediction operation comprises a predict instruction so that the processor determines whether a branch instruction will be predicted as taken prior to execution of the branch instruction.

5. The system of claim 1, wherein said branch instruction causes said program code to loop and said prediction operation comprises a repeat prediction operation so that the predicted number of times that the loop is executed is determined prior to the repeated execution of the branch instruction that causes the loop.

6. The system of claim 1, wherein said modifying means comprises means for changing the prediction of the behavior of the branch.

7. A method for inserting prediction operations into a program code independent of the execution of the program code, the program code comprising a plurality of instructions including branch instructions, to predict a behavior of a branch, the method comprising:

analyzing said program code prior to execution of the program code to locate a branch whose behavior depends on a predetermined characteristic;

computing the values of the predetermined characteristic prior to execution of the branch;

generating a prediction operation to store said values of said predetermined characteristic into a prediction data storage system; and inserting said prediction operation into said program code prior to the execution of the program code so that the prediction operation is executed before said branch instruction in order to predict the behavior of the branch instruction based on the computed values stored in the prediction data storage system.

8. The method of claim 7, wherein said predetermined characteristics comprises an induction variable.

9. The method of claim 7, wherein said predetermined characteristic comprises a prediction pattern.

10. The method of claim 7, wherein said predetermined characteristic comprises a prediction expression.

11. The method of claim 7, wherein said predetermined characteristic comprises a propagated value.

12. The method of claim 7, wherein said inserting comprises inserting said prediction operation into the program code during compilation of the program code.

13. A method for predicting the behavior of a branch instruction in a piece of program code based on information available independent of the execution of the branch instruction in the program code using a branch prediction system and a branch prediction data storage device, the method comprising:

inserting a prediction operation into the program code at a location relative to the branch instruction, the prediction operation calculating a value that is available prior to the execution of the branch instruction and predicts the behavior of the branch; and executing the program code, wherein the program code execution comprises executing the prediction operation which changes a value of the prediction data stored in the prediction data storage device for the branch instruction, and predicting the behavior of the branch instruction based, in part, on the value of the prediction data stored in the prediction data storage device.

* * * * *